2,732,373
Patented Jan. 24, 1956

2,732,373

BASIC HETEROCYCLIC ETHERS

Norbert Steiger, Nutley, N. J., assignor to Hoffmann-La Roche Inc., Nutley, N. J., a corporation of New Jersey No Drawing. Application June 14, 1954,
Serial No. 436,717

8 Claims. (Cl. 260—279)

This invention relates to novel chemical compounds and to novel processes of making the same. The invention is concerned with compounds which are structurally related to certain tricyclic heterocycles having a single heterocyclic nitrogen, oxygen or sulfur atom: specifically, the heterocycles referred to are acridine, xanthene and thiaxanthene. In the present disclosure, the terms "acridine," "xanthene" and "thiaxanthene" are used in the same sense as indicated for each term, respectively, under Nos. 1973, 2000 and 2019 in "The Ring Index" by Patterson and Capell (New York, N. Y., 1940); and the numbering systems herein employed to identify the compounds of the invention, related to acridine, xanthene or thiaxanthene as the case may be, are the preferred numbering systems indicated by "The Ring Index" under the serial numbers above cited.

More particularly, the invention relates to compounds selected from the class consisting of bases having the formula

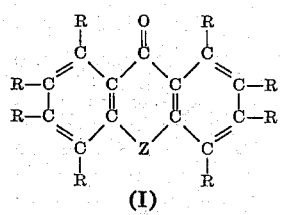

(I)

wherein Z is a bivalent radical selected from the group consisting of imino, oxo and thio, and each R is a monovalent radical selected from the group consisting of hydrogen, lower alkyl and di(lower alkyl)amino(lower alkoxy); at least one but not more than two of the radicals R being a di(lower alkyl)amino(lower alkoxy) radical and salts of said bases.

In the case of the acridine derivatives, the compounds of the invention can be characterized as comprising the 9(10H)-acridone nucleus of Formula II below, wherein is substituted a basic ether radical R as defined above:

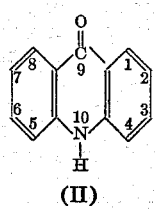

(II)

In the case of the xanthene derivatives, the compounds of the invention can be characterized as comprising the 9-xanthone nucleus of Formula III below, wherein is substituted a basic ether radical R as defined above:

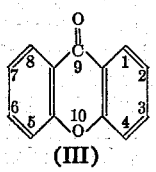

(III)

In the case of the thiaxanthene derivatives, the compounds of the invention can be characterized as comprising the 10-thiaxanthone nucleus of Formula IV below, wherein is substituted a basic ether radical R as defined above:

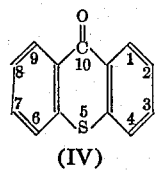

(IV)

It will be observed that the numbering plan for the thiaxanthone nucleus differs somewhat from those for the acridone and xanthone nuclei, respectively; in agreement with the preferred numbering systems employed by "The Ring Index."

In the compounds of the invention represented by Formula I above, at least one but not more than two of the radicals R attached to the aromatic rings is a di(lower alkyl)amino(lower alkoxy) radical, e. g. dimethylaminomethoxy, dimethylaminoethoxy, diethylaminoethoxy, dimethylamino(n-propoxy), diethylaminoisopropoxy, di(sec-hexyl)aminoethoxy, and the like. The remaining radicals R are either hydrogen or lower alkyl radicals, e. g. methyl, ethyl, n-propyl, isoamyl and the like, and these radicals R need not be identical.

Compounds of the invention represented by Formula I above are strong bases, and readily form acid addition salts with inorganic and organic acids, e. g. hydrochloric, hydrobromic, hydriodic, sulfuric, phosphoric, acetic, tartaric, oxalic, citric and ethanesulfonic acids, and the like; and also form quaternary ammonium salts with acyclic and cyclic quaternizing agents, such as lower alkyl halides (e. g. methyl bromide, ethyl iodide, n-butyl chloride), di(lower alkyl)sulfates (e. g. dimethylsulfate), benzyl halides (e. g. benzyl bromide), and the like. Since the bases of Formula I may be monoacidic or polyacidic bases, the salts formed by these bases include the mono- and poly-acid addition salts, and similarly mono- and poly-quaternary salts. The invention includes not only the bases of Formula I above but also all the acid addition salts and quaternary salts of said bases. A particularly preferred class of salts is those formed by the bases with the non-toxic acids and quaternizing agents conventionally employed in the preparation of chemotherapeutic substances. The bases of Formula I above and their salts are useful as chemotherapeutic agents, e. g. as anthelmintic agents (for instance in combatting pinworms as exemplified by *Syphacia obvelata*); and as antifungal agents (for instance in combatting *Trichophyton mentagrophytes* and *Microsporon lanosum*). The acridones are also useful as antitrypanosomal agents (for instance in combatting *Trypanosoma equiperdum*).

A general method for preparing the compounds of Formula I above comprises reacting a compound of the formula

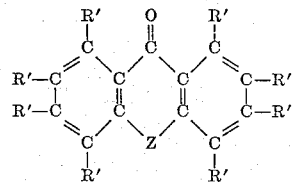

(V)

wherein Z has the same meaning indicated above; and R' is a monovalent radical selected from the group consisting of hydrogen, lower alkyl and hydroxyl; at least one but not more than two of the radicals R' being a hydroxyl radical with a di(lower alkyl)amino(lower alkyl) halide in the presence of an acid acceptor; e. g. by heating the reactant of Formula V together with the halide reactant in an inert organic solvent, in the presence of an alkali metal lower alkoxide. From the bases of Formula I, the acid addition salts and quaternary salts of the invention can be prepared, e. g. by heating the base with the appropriate acid or quaternizing agent, respectively.

The invention is further disclosed in the following examples, which are illustrative but not limitative thereof.

Example 1

38.5 g. of 4-hydroxy-9(10H)-acridone, 400 cc. of chlorobenzene, 12 g. of sodium methoxide and 50 cc. of methanol were stirred and heated to distil off methanol, until the temperature of the reaction mass reached 130° C. The reaction mixture was then cooled to 100° C. and 30 g. of β-diethylaminoethyl chloride was added. The mixture was then stirred and refluxed for four hours. 250 cc. of water and 10 cc. of 40 per cent sodium hydroxide solution were added at 100° C., and the stirring was continued for an additional half hour. The reaction mixture was then allowed to stratify, and the chlorobenzene layer was taken off, dried over sodium sulfate, and concentrated in vacuo. The residual oil was digested with ether, and the crystalline product which separated was recrystallized from a mixture of benzene and petroleum ether. The 4-(β-diethylaminoethoxy)-9(10H)-acridone thus obtained was a tan solid, of melting point 62° C., insoluble in water, but soluble in acids, e. g. normal hydrochloric acid, normal sulfuric acid, acetic acid and propionic acid.

The dihydrochloride of the above base was prepared by dissolving 5 g. of the recrystallized tan solid of M. P. 62° C. in 75 cc. of acetone, and adding to the solution, at 0° C., 5 cc. of 35 per cent ethanolic hydrogen chloride. The 4-(β-diethylaminoethoxy)-9(10H)-acridone dihydrochloride thus obtained was a light yellow powder, M. P. 236–238° C. after recrystallization from acetone. It was soluble in water.

A methyl bromide quaternary salt of the above base was prepared by dissolving 6 g. of the recrystallized base of M. P. 62° C. in 35 cc. of acetone, filtering, and adding to the filtrate 10 cc. of a 23 per cent w./v. solution of methyl bromide in acetone. The mixture was allowed to stand 48 hours in the refrigerator, whereupon 4-(β-diethylaminoethoxy) - 9(10H) - acridone methobromide crystallized, M. P. 229–230° C. This salt was soluble in water.

Example 2

29 g. of 2-hydroxy-9(10H)-acridone, 350 cc. of chlorobenzene, 10 g. of sodium methoxide and 50 cc. of methanol were stirred and heated to distil off the methanol as in Example 1. The sodium salt of the hydroxyacridone thus obtained was condensed with 25 g. of diethylaminoethyl chloride in the same manner as described in Example 1, and crystalline condensation product was likewise recovered in the same manner as described in that example. The 2-(β-diethylaminoethoxy)-9(10H)-acridone thus obtained, slightly yellow crystals after recrystallization from chlorobenzene, had M. P. 209–211° C. The product was insoluble in water but slightly soluble in alcohol.

By dissolving the above base in methanol and adding ethanolic hydrogen chloride, the dihydrochloride was obtained: yellow crystals, M. P. 183° C. with decomposition, after recrystallization from a mixture of methanol and acetone. This salt was soluble in water.

Example 3

32 g. of 1-methyl-4-hydroxy-9(10H)-acridone, 10 g. of sodium methylate, 350 cc. of chlorobenzene and 50 cc. of methanol, were reacted to form the sodium salt of the acridone as in Example 1. The reaction mixture was cooled to about 100° C. and reacted with 25 g. of β-diethylaminoethyl chloride. The condensation product was recovered as in Example 1, and recrystallized from ether and then from alcohol. The tan material thus obtained, 1-methyl-4-(β-diethylaminoethoxy)-9(10H)-acridone, M. P. 147–148° C., was insoluble in water.

A soluble hydrochloride was prepared by dissolving the base in methanol and passing hydrogen chloride gas into the solution, with cooling, until saturation. Upon addition of ether, a dihydrochloride of yellowish color precipitated. Upon recrystallization from 95 percent ethanol, and drying in the oven at 95° C., the dihydrochloride lost one mol of HCl. The resulting monohydrochloride melted at 234–236° C.

Example 4

25 g. of 4-hydroxy-9-xanthone, 10 g. of sodium methoxide, 300 cc. of chlorobenzene and 40 cc. of methanol were stirred and heated in such a way that the methanol was allowed to distil off until the reaction mixture reached a temperature of 130° C. The mixture was then cooled to about 100° C. and 25 g. of β-diethylaminoethyl chloride were added. The mass was stirred and refluxed at 130° C. for 5 hours and then cooled to 100° C. 250 cc. of water and 10 cc. of 40 per cent sodium hydroxide solution were added and the mixture was stirred for an additional hour. The mixture was allowed to stratify into layers; the chlorobenzene layer was taken off, dried over sodium sulfate and concentrated in vacuo. The residual oil was dissolved in ether, cooled to —5° C. and reacted with 25 cc. of 35 per cent ethanolic hydrogen chloride. The crude hydrochloride thus precipitated was recrystallized from alcohol. The resulting white crystalline 4-(β-diethylaminoethoxy)-9-xanthone hydrochloride melted at 236° C. It was soluble in water.

Example 5

25 g. of 2-hydroxy-9-xanthone, 10 g. of sodium methoxide, 300 cc. of chlorobenzene, 40 cc. of methanol and 25 g. of β-diethylaminoethyl chloride were reacted in the same way as described in Example 4. After recrystallization from ethanol, the 2-(β-diethylaminoethoxy-9-xanthone hydrochloride had M. P. of 194–195° C. This product was a white crystalline materal soluble in water.

Example 6

23 g. of 2,7-dihydroxy-9-xanthone, 16 g. of sodium methoxide, 350 cc. of chlorobenzene and 60 cc. of methanol were reacted to form the disodium salt, in the same manner described in Example 4. The disodium salt thus obtained was condensed with 33 g. of β-diethylaminoethyl chloride by refluxing the reaction mixture for 5 hours at 130° C. The reaction mixture was then cooled to 100° C., and 300 cc. of water and 10 cc. of 40 per cent sodium hydroxide solution were added, and the whole stirred for ½ hour. The mixture was allowed to stratify, the chlorobenzene layer was separated and dried over sodium sulfate and concentrated in vacuo. The residual oil was dissolved in 300 cc. of ether, filtered, the filtrate was chilled to —5° C. and precipitated with 30 cc. of 35 per cent ethanolic hydrogen chloride. The 2,7-bis(β-diethylaminoethoxy)-9 - xanthone dihydrochloride thus obtained was recrystallized from methanol, M. P. 229° C. It was a white crystalline material soluble in water.

Example 7

30 g. of 4-methyl-8-hydroxy-10-thiaxanthone, 10 g. of sodium methoxide, 350 cc. of chlorobenzene, and 50 cc. of methanol were stirred and heated to a temperature of 130° C., a portion of the methanol distilling off in the meantime. The reaction mixture was then cooled to 100° C., and 27 g. of β-diethylaminoethyl chloride was added, and the mixture was then stirred and refluxed for 4 hours. At the end of this time, the reaction mixture was cooled to 100° C. and 250 cc. of water and 10 cc. of 40 per cent sodium hydroxide solution were added, and stirring was continued for ½ hour longer. The chlorobenzene layer was then separated and dried over sodium sulfate and concentrated in vacuo. The residual oil was dissolved in 300 cc. of ether, and to the solution were added 20 cc. of 35 per cent ethanolic hydrogen chloride. The resulting 4-methyl-8-(β-diethylaminoethoxy)-10-thiaxanthone hydrochloride was recrystallized from a mixture of acetone and alcohol: slightly yellow crystals, M. P. 212–214° C., soluble in water and in alcohol.

I claim:

1. A compound selected from the class consisting of bases having the formula

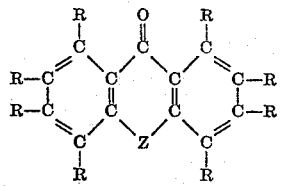

wherein Z is a bivalent radical selected from the group consisting of imino, oxo and thio, and each R is a monovalent radical selected from the group consisting of hydrogen, lower alkyl and di(lower alkyl)amino(lower alkoxy); at least one but not more than two of the radicals R being a di(lower alkyl)amino(lower alkoxy) radical and salts of said bases.

2. A monosubstituted 9(10H)-acridone wherein the sole substituent is a di(lower alkyl)amino(lower alkoxy) radical attached to a nuclear carbon atom.

3. A monosubstituted 9-xanthone wherein the sole substituent is a di(lower alkyl)amino(lower alkoxy) radical attached to a nuclear carbon atom.

4. A monosubstituted 10-thiaxanthone wherein the sole substituent is a di(lower alkyl)amino(lower alkoxy) radical attached to a nuclear carbon atom.

5. A disubstituted 9(10H)-acridone wherein the two substituents are (1) a di(lower alkyl)amino(lower alkoxy) radical and (2) a lower alkyl radical, each substituent being attached to a separate nuclear carbon atom.

6. Acid addition salts of the compounds of claim 5.

7. 1-methyl - 4 - (β - diethylaminoethoxy) - 9(10H)-acridone.

8. 1 - methyl - 4 - (β - diethylaminoethoxy) - 9(10H)-acridone hydrochloride.

References Cited in the file of this patent

FOREIGN PATENTS 490,418     Germany _____ Jan. 9, 1930